(12) United States Patent
Rigney et al.

(10) Patent No.: US 6,283,714 B1
(45) Date of Patent: Sep. 4, 2001

(54) PROTECTION OF INTERNAL AND EXTERNAL SURFACES OF GAS TURBINE AIRFOILS

(75) Inventors: Joseph D. Rigney, Milford; Michael J. Weimer, Loveland; Ramgopal Darolia, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/373,271

(22) Filed: Aug. 11, 1999

(51) Int. Cl.$^7$ ..................................................... F01D 5/14
(52) U.S. Cl. ................... 416/241 R; 416/241 B; 415/217.1
(58) Field of Search .................. 415/200, 217.1; 416/229 A, 230, 193 A, 224, 241 A, 241 B, 341 R; 29/889.1, 889.7; 427/181, 182, 237, 252, 454; 428/469, 472, 632

(56) References Cited

U.S. PATENT DOCUMENTS

| | | | |
|---|---|---|---|
| 4,031,274 | * | 6/1977 | Bessen .................................. 427/229 |
| 4,321,310 | * | 3/1982 | Ulion et al. .......................... 428/612 |
| 4,347,267 | * | 8/1982 | Baldi ..................................... 427/237 |
| 5,015,502 | * | 5/1991 | Strangman et al. ............... 427/248.1 |
| 5,221,354 | | 6/1993 | Rigney ................................. 118/725 |
| 5,538,796 | * | 7/1996 | Schaffer et al. ..................... 428/469 |
| 5,702,288 | * | 12/1997 | Liebke et al. .......................... 451/36 |
| 5,807,428 | * | 9/1998 | Bose et al. ......................... 106/14.44 |
| 5,928,725 | * | 7/1999 | Howard et al. ...................... 427/237 |
| 5,967,755 | | 10/1999 | Czech et al. ...................... 416/241 R |
| 6,042,880 | * | 3/2000 | Rigney et al. ....................... 427/142 |

FOREIGN PATENT DOCUMENTS 09004406 7/1997 (JP).
97/05299 2/1997 (WO).

* cited by examiner

Primary Examiner—Edward K. Look
Assistant Examiner—Ninh Nguyen
(74) Attorney, Agent, or Firm—Andrew C. Hess; David L. Narciso

(57) ABSTRACT

A gas turbine airfoil includes an internal cooling passage defined by an internal airfoil surface, and an external airfoil surface. The gas turbine airfoil is protected on both the internal airfoil surface and the external airfoil surface. The internal airfoil surface is protected by forming a diffusion aluminide protective layer at the internal airfoil surface of the internal cooling passage, with substantially no aluminum deposited on the external airfoil surface during the step of forming. The external airfoil surface is protected by depositing an overlay protective coating on the external airfoil surface, with substantially no aluminum or diffusion aluminide between the overlay protective coating and the external airfoil surface. The gas turbine airfoil is operated in a gas turbine engine, and may later be removed for repair. Repair is accomplished by removing the overlay protective coating from the external airfoil surface of the airfoil, restoring the airfoil dimensions as needed, and depositing a second overlay protective coating on the external airfoil surface of the gas turbine airfoil, with substantially no diffusion aluminide layer between the second overlay protective coating and the external airfoil surface of the airfoil.

20 Claims, 3 Drawing Sheets

PROTECTION OF INTERNAL AND EXTERNAL SURFACES OF GAS TURBINE AIRFOILS

FIELD OF THE INVENTION

This invention relates to a gas turbine airfoil having an internal cooling passage, and, more particularly, to the protection of the internal and external surfaces of such a gas turbine airfoil.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at metal temperatures of up to about 1900–2100° F.

Many approaches have been used to increase the operating temperature limit of the turbine blades and vanes to their current levels. For example, the composition and processing of the base materials themselves have been improved.

Physical cooling techniques may also be used. In one technique, internal cooling passages through the interior of the turbine airfoil are present. Air is forced through the cooling passages and out openings at the external surface of the airfoil, removing heat from the interior of the airfoil and, in some cases, providing a boundary layer of cooler air at the surface of the airfoil. To attain maximum cooling efficiency, the cooling passages are placed as closely to the external surface of the airfoil as is consistent with maintaining the required mechanical properties of the airfoil, to as little as about 0.020 inch in some cases.

In another approach, a protective layer or a ceramic/metal thermal barrier coating (TBC) system is applied to the airfoil, which acts as a substrate. The protective layer with no overlying ceramic layer (in which case the protective layer is termed an "environmental coating") is useful in intermediate-temperature applications. The currently known protective layers include diffusion aluminides and overlays. A ceramic thermal barrier coating layer may be applied overlying the protective layer on the external airfoil surface, to form a thermal barrier coating system (in which case the protective layer is termed a "bond coat"). The thermal barrier coating system is useful in higher-temperature applications. The ceramic thermal barrier coating insulates the component from the combustion gas, permitting the combustion gas to be hotter than would otherwise be possible with the particular material and fabrication process of the substrate.

During normal service of a gas turbine blade or vane, the airfoil layer is typically damaged by particle impacts and by oxidation/corrosion in the hot combustion gas environment. If the damage is not too severe, the gas turbine blade or vane may be removed from service, repaired, and returned to service. The repair typically includes, among other things, stripping away the damaged protective coating and thermal barrier coating layer, if any, from the external airfoil surface, and applying new protective coatings.

For those cases where the airfoil has internal cooling passages, the removal of the external protective coating during repair operations reduces the remaining structural thickness of base metal that lies between the internal cooling passage and the external airfoil surface. The inventors have determined that this is particularly a concern when the external protective coating, or an inner portion of the external protective coating, experiences significant diffusion into the base metal either during manufacturing or during service. For example, a typical 0.002 inch thick diffusion aluminide coating includes a diffusion zone that is about 0.001 inch thick, and an "add-on" layer that is about 0.001 inch thick. The diffusion zone consumes a portion of the wall of the airfoil, reducing its effective thickness for supporting loads. When this thickness becomes so reduced that it can no longer support the required structural loads, the turbine blade or vane becomes unrepairable, and must be discarded even though otherwise it could be repaired and returned to service.

There is a need for an improved approach to the protection of gas turbine airfoils containing internal cooling passages, which permits their repeated repair without loss of structural integrity. The present invention fulfills this need, and further provides related advantages.

BRIEF SUMMARY OF THE INVENTION

The present approach provides a technique for protecting the internal cooling passage walls and also the external surfaces of a gas turbine airfoil. The technique allows the wall thickness between the internal cooling passages and the external surface to be maintained after one or more repair operations in which the external protective coating is removed and replaced. Airfoils which previously would have been unrepairable can now be repaired with confidence. Designers of airfoils can therefore select wall thicknesses with the knowledge that they will be maintained even after repairs, allowing the wall thicknesses to be selected for maximum cooling efficiency and structural integrity, and reduced rotor weight. The result is an improved thrust-to-weight ratio of the gas turbine engine.

A gas turbine component includes a gas turbine airfoil formed of a base metal and having an internal cooling passage therein defined by an internal airfoil surface, and an external airfoil surface. A method for preparing a coated gas turbine airfoil comprises the step of forming a diffusion aluminide protective layer at the internal airfoil surface of the internal cooling passage. There is substantially no aluminum deposited on the external airfoil surface of the gas turbine airfoil during the internal diffusion aluminiding. The method further includes depositing an overlay protective coating on the external airfoil surface of the gas turbine airfoil, there being substantially no diffusion aluminide between the overlay protective coating and the external airfoil surface.

The diffusion aluminide protective layer at the internal airfoil surface of the internal cooling passage is preferably formed by contacting aluminum-containing compounds to the internal airfoil surface to deposit aluminum thereon, and interdiffusing the aluminum into the base metal. Modifying elements such as hafnium, zirconium, yttrium, silicon, titanium, tantalum, cobalt, chromium, platinum, and palladium, and combinations thereof may be applied with the aluminum, and diffused into the base metal with the aluminum. The aluminum and optional modifying elements are applied by any operable technique, such as slurry coating, foam coating, chemical vapor deposition, organo-metallic chemical vapor deposition, pack cementation, or vapor phase aluminiding. When the airfoil is a turbine blade, the aluminum is preferably flowed from a root end of the internal cooling passage toward a tip end of the internal cooling passage. In all cases, care is taken that aluminum does not deposit onto the external surface of the airfoil.

The overlay protective coating is deposited on the external surface of the airfoil, preferably as an MCrAlX alloy. A ceramic coating of, for example, yttria-stabilized zirconia may be deposited overlying the overlay protective coating. The overlay protective coating and the ceramic coating are preferably applied by a technique such as thermal spray, air plasma spray, low pressure plasma spray, high-velocity oxyfuel, ion plasma deposition, electron beam physical vapor deposition, sputtering, cathodic arc, or other physical deposition techniques.

The internal diffusion aluminide protective layer and the external overlay protective coating may be deposited in any order. That is, the forming of the diffusion aluminide protective layer may be completed prior to the initiation of the deposition of the overlay protective coating. Alternatively, the deposition of the overlay protective coating may be completed prior to the initiation of the forming of the diffusion aluminide protective layer. In this option, there may be deposition of aluminum over the overlay coating, but this does not adversely affect the subsequent processing. The ceramic coating, if any, is preferably applied after both the internal and external protective coatings are applied.

The use of the present approach yields particularly advantageous results when the airfoil is operated in a gas turbine engine, removed from the gas turbine engine, and repaired. The step of repairing includes the steps of removing the overlay protective coating from the external airfoil surface of the airfoil, restoring the airfoil's dimensions (particularly its length) as needed, and depositing a second overlay protective coating on the external airfoil surface of the gas turbine airfoil. There is substantially no diffusion aluminide layer between the second overlay protective coating and the external airfoil surface of the airfoil.

The overlay protective coating on the external surface of the airfoil is a true overlay. During elevated-temperature service there is substantially reduced penetration of the overlay coating into the bulk metal at the external surface, as compared with the degree of penetration that is typical of a diffusion aluminide. By contrast, many prior types of overlay protective coatings involve a layer such as an external-surface diffusion aluminide between the overlay protective coating and the bulk metal at the external surface of the airfoil. The further diffusion during service and/or removal of this external-surface diffusion aluminide layer during a repair operation removes some of the effective metal thickness of base metal between the internal cooling passages and the external surface, resulting in a structural weakening of that portion of the airfoil. In the present approach, care is taken so that there is no such layer on the external surface to be removed at the time of repair, so that the base-metal thickness remains substantially less affected by the repair operation. The airfoil therefore may be repaired multiple times.

Another important advantage is that the external and internal coating compositions and processes are independent of each other and are selected to optimize performance of the respective protective coatings and layers. This feature allows the tailoring of the coating compositions and processes for selected areas of the protected component. For example, the performance of the internal aluminide coating may be enhanced by incorporation of beneficial modifying elements such as hafnium, zirconium, yttrium, silicon, titanium, tantalum, cobalt, chromium, platinum, or palladium, or combinations thereof, without affecting the performance of the external coating.

A further advantage of the present approach is that airfoils may be designed with thinner walls that are not required to carry a "dead weight" of diffusion aluminide coating layer, thereby reducing the overall weight of the rotor. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
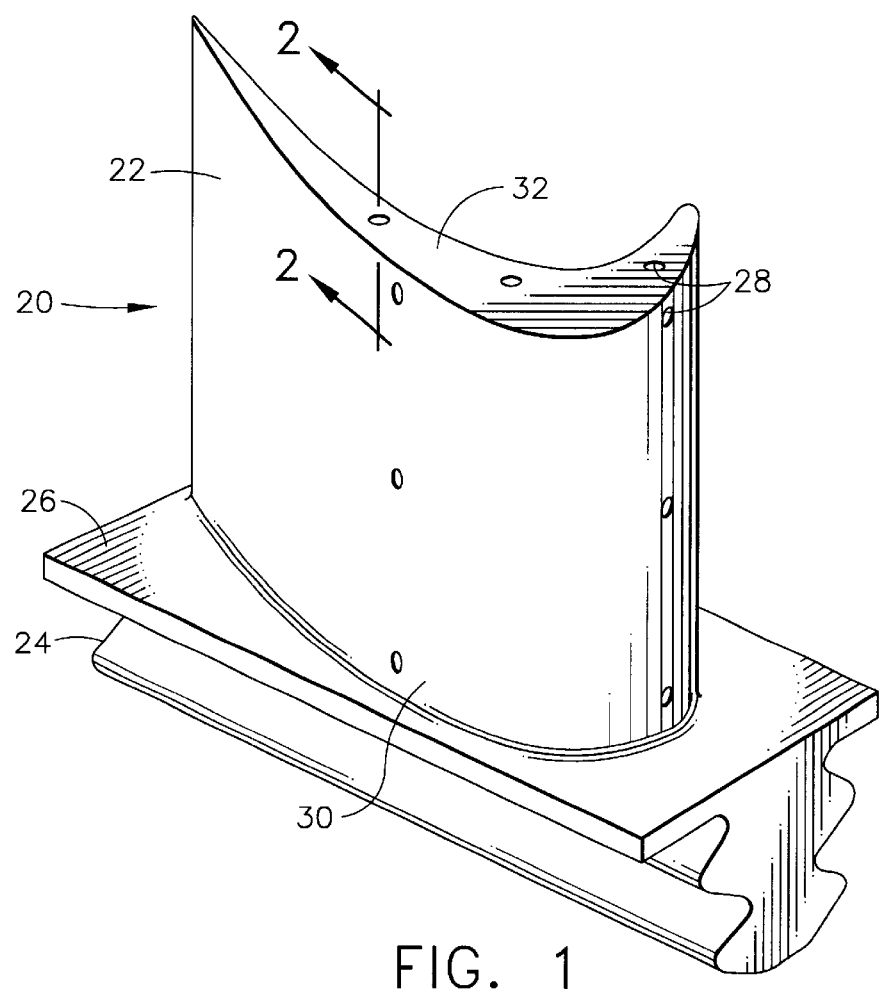
FIG. 1 is a perspective view of a turbine blade.

FIG. 1 depicts a component article of a gas turbine engine such as a turbine blade or turbine vane, and in this illustration a turbine blade 20. The turbine blade 20 is formed of any operable material, but is preferably a nickel-base superalloy. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24. A number of internal cooling passages extend through the interior of the airfoil 22, ending in openings 28 in the surface of the airfoil 22. A flow of cooling air is directed through the internal cooling passages, to reduce the temperature of the airfoil 22. The airfoil 22 may be described as having a root end 30 adjacent to the dovetail 24, and an oppositely disposed tip end 32 remote from the dovetail 24.

Figure 2:
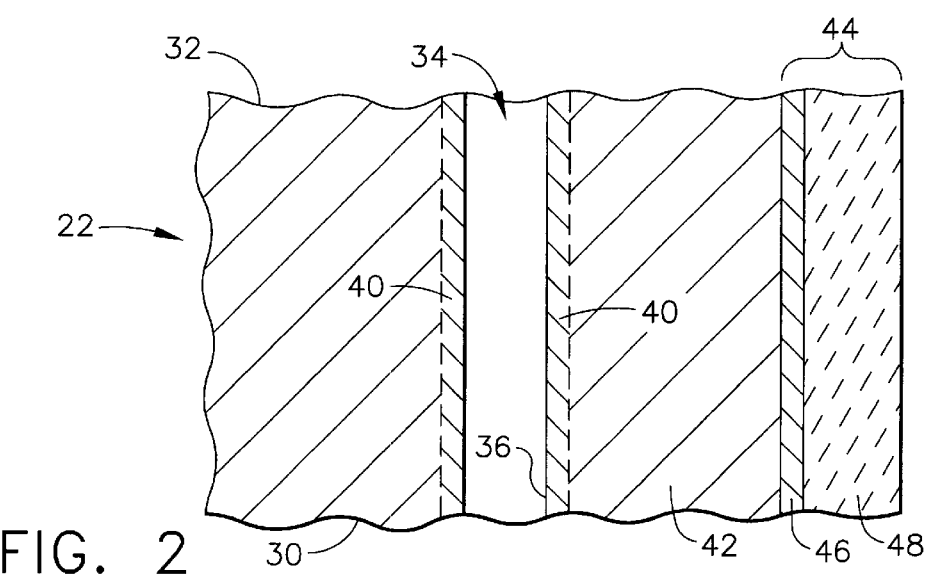
FIG. 2 is an enlarged schematic sectional view through the turbine blade of FIG. 1, taken on lines 2—2.

FIG. 2 is a longitudinal section through the airfoil 22, showing one of the internal cooling passages 34 extending through an interior of the airfoil 22. The internal cooling passage 34 has an internal airfoil surface 36, and there is also an external airfoil surface 38 of the metallic portion of the airfoil 22.

A diffusion aluminide protective layer 40 is present at the internal airfoil surface 36. The diffusion aluminide is formed by depositing aluminum onto the internal airfoil surface 36, so that a body of the airfoil 22 serves as a substrate 42. The aluminum may be modified with elements such as hafnium, zirconium, yttrium, silicon, titanium, tantalum, cobalt, chromium, platinum, and palladium, and combinations thereof to improve its corrosion resistance and other properties. The aluminum (and modifying elements, if any) is interdiffused with the material of the substrate 42 to form the aluminum-enriched protective layer 40 lying below the internal airfoil surface 36. The diffusion aluminide protective layer 40 has a composition with the aluminum concentration highest near the internal airfoil surface 36, and decreasing aluminum concentration with increasing distance into the substrate 42 from the internal airfoil surface 36. The diffusion aluminide protective layer 40 is typically from about 0.0005 inch to about 0.003 inch thick. When exposed to a high-temperature oxidizing environment, the aluminum-enriched layer at the internal airfoil surface 36 oxidizes to form a highly adherent aluminum oxide ($Al_2O_3$) protective scale at the internal airfoil surface 36, inhibiting and slowing further oxidation damage. An overlay coating such as discussed next and applied to the external airfoil surface 38 is not used on the internal airfoil surface 36.

An overlay protective coating 44 overlies and contacts the external airfoil surface 38. The overlay protective coating 44 has a protective layer 46 overlying and contacting the external airfoil surface 38. The protective layer 46 is preferably formed of an MCrAlX composition. The terminology "MCrAlX" is a shorthand term of art for a variety of families of overlay protective layers 46 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. Recent developments in this area have identified NiAlCrZr and NiAlZr overlay coatings as particularly useful. Preferred compositions are listed in U.S. application Ser. Nos. 09/166,883, 08/932,304, and 09/232,518. Preferred protective layers 46 comprise β-phase NiAl intermetallics containing 30 to 60 atomic percent aluminum and at least one element chosen from the group consisting of 0.5 to 25 atomic percent chromium, 0.1 to 5 atomic percent titanium, 0.1 to 5 atomic percent tantalum, 0.1 to 5 atomic percent silicon, 0.01 to 2.0 atomic percent gallium, 0.2 to about 0.5 atomic percent zirconium, and 0.02 to 0.2 atomic percent gallium. The protective layer 46 is from about 0.0005 to about 0.005 inch thick. Such protective layers 46 are generally known in the art, although specific compositions may not be known.

The previously discussed diffusion aluminide protective layer is not present on the external airfoil surface 38 in the present approach. It has sometimes been the practice in the past to deposit an aluminum layer on the external airfoil surface 38, prior to depositing the protective layer 46. That is not permissible with the present invention, and in fact care is taken so that substantially no aluminum is deposited on the external airfoil surface 38 prior to depositing the protective layer 46.

Optionally, a ceramic layer 48 overlies and contacts the protective layer 46. The ceramic layer 48 is preferably yttria-stabilized zirconia, which is zirconium oxide containing from about 2 to about 12 weight percent, preferably from about 3 to about 8 weight percent, of yttrium oxide. The ceramic layer 48 is typically from about 0.003 to about 0.010 inch thick. Other operable ceramic materials may be used as well. When there is no ceramic layer 48 present, the protective layer 46 is termed an "environmental coating". When there is a ceramic layer 48 present, the protective layer 46 is termed a "bond coat".

Figure 3:
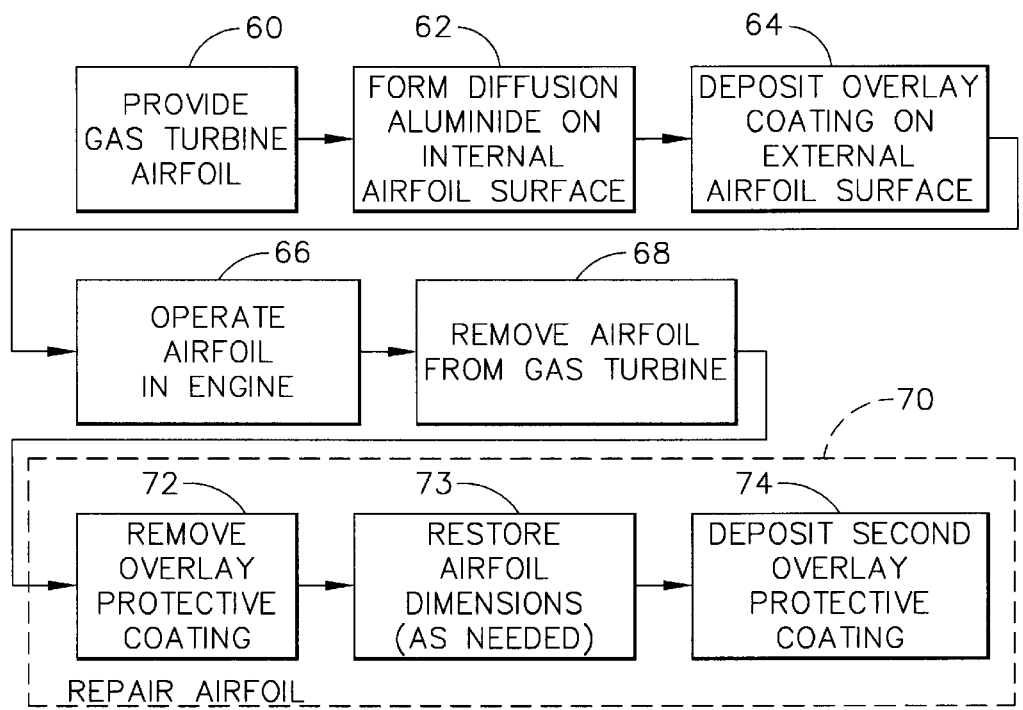
FIG. 3 is a block flow diagram of a first approach for preparing a coated gas turbine airfoil.

FIG. 3 illustrates a first preferred approach for practicing the method for preparing a coated gas turbine airfoil. The gas turbine airfoil 22 is provided, numeral 60. The gas turbine airfoil 22 may be made of any operable material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene' 142, which has a nominal composition in weight percent of about 6.8 percent chromium, 12.0 percent cobalt, 1.5 percent molybdenum, 2.8 percent rhenium, 1.5 percent hafnium, 6.15 percent aluminum, 4.9 percent tungsten, 6.35 percent tantalum, 150 parts per million boron, 0.12 percent carbon, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The diffusion aluminide protective layer 40 is formed at the internal airfoil surface 36, numeral 62. Aluminum and optional modifying elements are first deposited onto the internal airfoil surface 36 by any operable technique. In one approach, the source of aluminum is preferably a gaseous source, as in vapor phase aluminiding. A hydrogen halide gas, such as hydrogen chloride, is contacted with aluminum metal or an aluminum alloy to form the corresponding aluminum halide gas. Aluminide-modifying elements such as hafnium, zirconium, yttrium, silicon, titanium, tantalum, cobalt, chromium, platinum, and palladium, may optionally be doped from similar sources into the gaseous source. The source gas is passed through the cooling passages 34, so that it contacts the internal airfoil surfaces 36. Aluminum, with any optional dopants included, is deposited onto the internal airfoil surface 36 along the length of each cooling passage 34. The deposition reaction typically occurs at elevated temperature such as from about 1800° F. to about 2100° F. so that deposited aluminum atoms interdiffuse into the substrate 42. An aluminum coating about 0.002 inch thick may be deposited in about 4–8 hours using this approach. Other known and operable aluminum-deposition techniques such as pack cementation, above-the-pack aluminiding, slurry deposition, chemical vapor deposition (CVD), and organo-metallic chemical vapor deposition may also be used.

Care is taken during step 62 that minimal, and preferably no, aluminum is deposited onto the external airfoil surface 38. The external airfoil surface 38 may be protected against unintentional and undesired deposition of aluminum by any operable technique, including but not limited to maskants, aluminum gettering materials, protective gas flows, and/or plugging of some of the openings 28. To further aid in protecting against unintentional deposition of aluminum onto the external airfoil surface 38, the aluminum source gas may be flowed from the root end 30 of the cooling passages 34 toward the tip end 32, and then directed from the openings 28 at the tip end 32 away from the external airfoil surface 38.

The overlay protective coating 44 is deposited overlying and contacting the external airfoil surface 38, numeral 64. The overlay protective coating 44 includes the protective layer 46 deposited onto the external airfoil surface 38. The protective layer 46 is preferably of the MCrAlX type discussed above. The protective layer 46 is preferably from about 0.0005 to about 0.005 inch, most preferably about 0.002 inch, thick. The protective layer 46 is deposited by any operable technique, such as physical vapor deposition (e.g., sputtering, cathodic arc, ion plasma, electron beam) or thermal spray. No aluminum layer is deposited onto the external airfoil surface 38 as part of this step.

The overlay protective coating 44 optionally includes the ceramic layer 48, deposited overlying and contacting the protective layer 46. The ceramic layer 48 is preferably from about 0.003 to about 0.010 inch thick, most preferably about 0.005 inch thick. (FIG. 2 is not drawn to scale.) The ceramic layer 48 is preferably yttria-stabilized zirconia, which is zirconium oxide containing from about 2 to about 12 weight percent, most preferably from about 3 to about 8 weight percent, of yttrium oxide. It may be deposited by any operable technique, such as physical vapor deposition or thermal spray. Other operable ceramic materials may be used as well.

The internal and external coating of the airfoil 22 is now complete. It is assembled to a turbine disk and operated in a gas turbine engine, numeral 66. It is later removed from the gas turbine engine, numeral 68, and repaired, numeral 70. The repair procedure includes removing the overlay protective coating 44 from the external airfoil surface 38, numeral 72, typically by chemical dissolution. The dimensions of the component article are restored by known techniques, numeral 73. A second (new) overlay protective coating, preferably the same type of overlay protective coating 44 as originally deposited, is deposited onto the external airfoil surface 38, numeral 74. No further coating or diffusion aluminiding of the internal airfoil surfaces 36 is performed.

Figure 4:
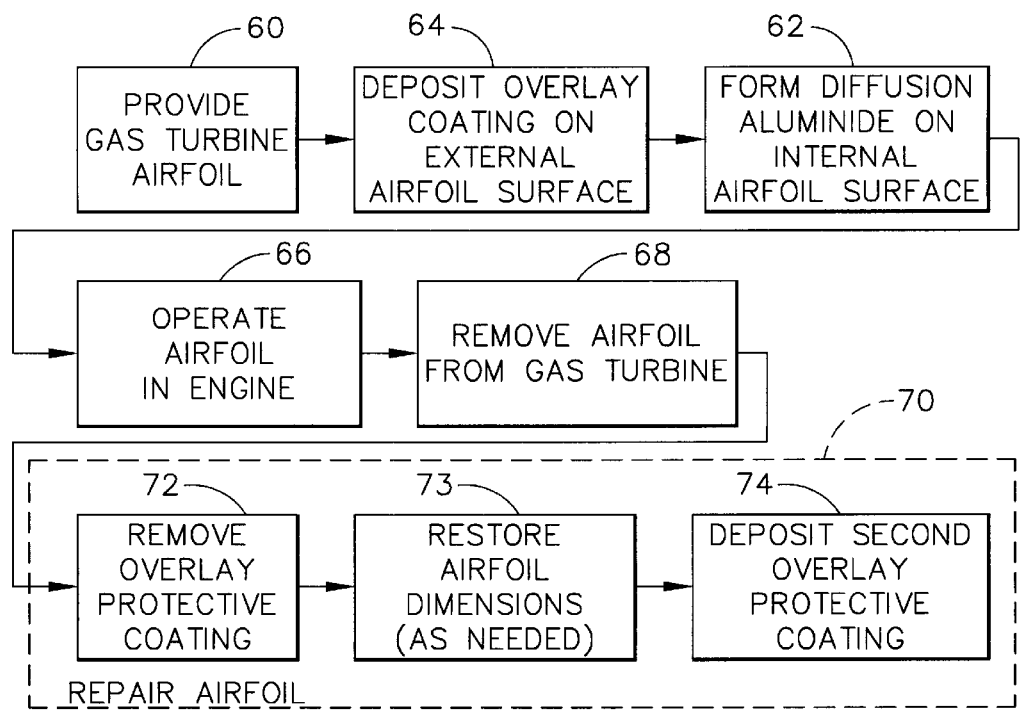
FIG. 4 is a block flow diagram of a second approach for preparing a coated gas turbine airfoil.

FIG. 4 depicts a second preferred approach for practicing the method for preparing a coated gas turbine airfoil. The approach of FIG. 4 is the same as that of FIG. 3, except that the order of steps 62 and 64 is reversed in the approach of FIG. 4. The above description of the steps 60–74 is incorporated by reference here.

The practical difference between the approaches of FIGS. 3 and 4 is that, in the approach of FIG. 4, because the diffusion aluminide protective layer 40 is formed after the protective layer 46 is formed, less care is required to ensure that no aluminum is deposited overlying the protective layer 46. The protective layer 46 is typically relatively high in aluminum, with a consequent lower driving force for the deposition of aluminum thereon.

The present invention has been successfully reduced to practice on over fifty turbine blades by internally coating the cooling passages 34 with aluminum using a slurry/pack process, and depositing an overlay NiCrAlZr protective layer 46, by electron beam physical vapor deposition or the high-velocity oxyfuel process, on the external airfoil surface 38.

Figure 5:
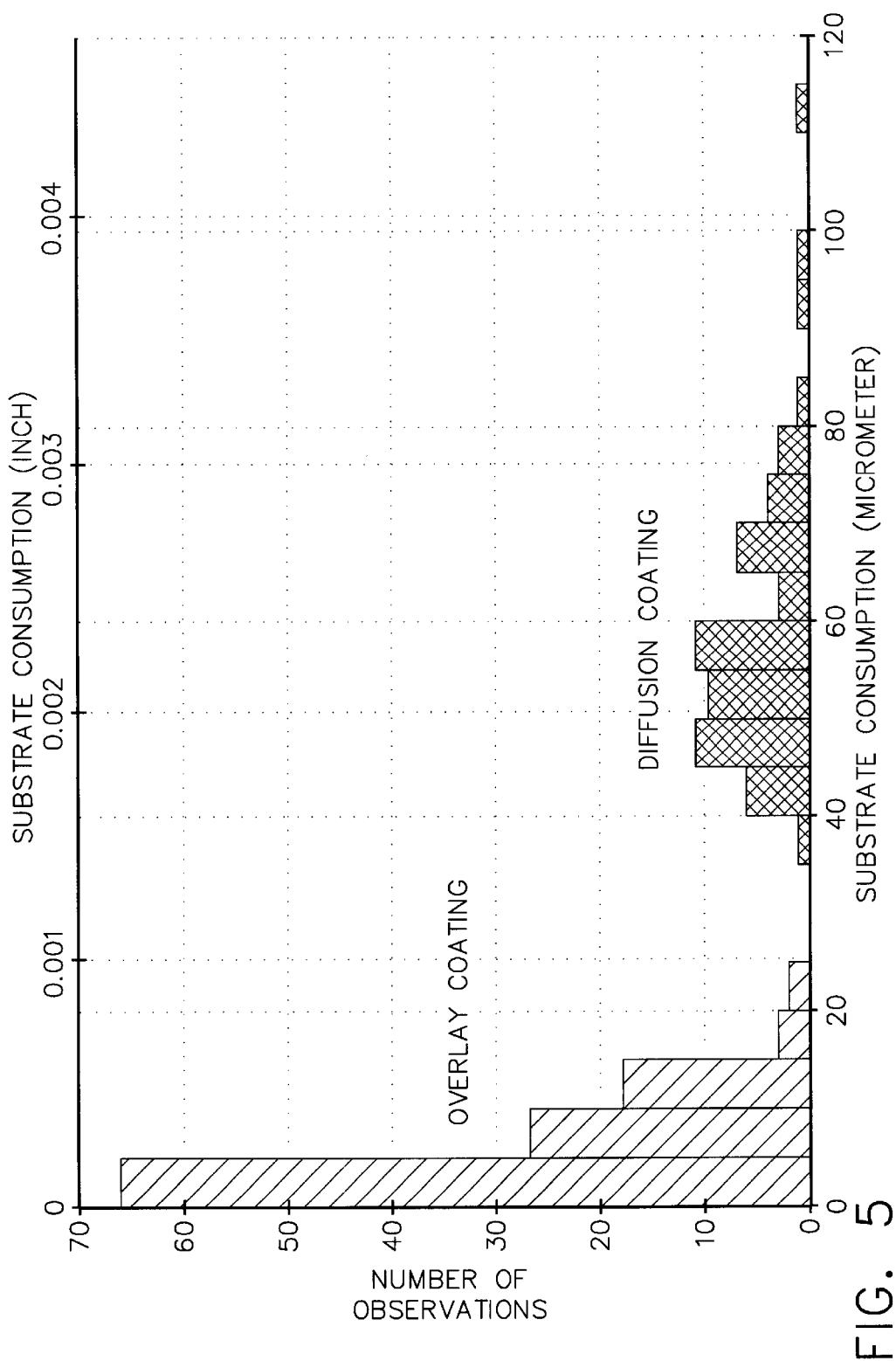
FIG. 5 is a chart of substrate consumption for overlay and diffusion coatings.

A total of 180 coated specimen coupons and airfoil sections were prepared from these turbine blades and were evaluated for substrate consumption with the NiCrAlZr overlay coatings and aluminide diffusion coatings, and the results are shown in FIG. 5. After a 47 hour exposure at 2050° F., substrate consumption averaged about 0.0005 inch for overlay coatings (with 0.001 inch to 0.003 inch additive layers and 0.0002 inch diffusion zones as deposited, and about 0.0022 inch for diffusion aluminides (with 0.001 inch additive layers and 0.001 inch diffusion zones). That is, on average about 0.0017 inch of additional substrate remained for the overlay coatings as compared with the diffusion aluminides. This difference amounts to over 8 percent of the thickness of a 0.020 inch wall thickness between the internal cooling passage and the external article surface, a significant consideration for airfoil design.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a coated gas turbine airfoil, comprising the steps of providing a gas turbine airfoil formed of a base metal having an internal cooling passage therein defined by an internal airfoil surface, and an external airfoil surface;

forming a diffusion aluminide protective layer at the internal airfoil surface of the internal cooling passage, there being substantially no aluminum deposited on the external airfoil surface of the gas turbine airfoil during the step of forming; and depositing an overlay protective coating on the external airfoil surface of the gas turbine airfoil, there being substantially no diffusion aluminide between the overlay protective coating and the external airfoil surface.

2. The method of claim 1, wherein the step of forming includes the step of applying an aluminum-containing deposit on the internal airfoil surface of the internal cooling passage, and interdiffusing the aluminum into the internal airfoil surface of the internal cooling passage.

3. The method of claim 1, wherein the airfoil is a turbine blade having a tip end and a root end, and wherein the step of forming includes the step of flowing a source comprising aluminum from a root end of the internal cooling passage toward a tip end of the internal cooling passage.

4. The method of claim 1, wherein the step of forming includes the step of applying an aluminum-containing deposit on the internal airfoil surface of the internal cooling passage by a method selected from the group consisting of slurry coating, foam coating, chemical vapor deposition, organo-metallic chemical vapor deposition, pack cementation, above-the-pack aluminiding, and vapor phase aluminiding.

5. The method of claim 1, wherein the protective layer comprises an overlay MCrAlX composition.

6. The method of claim 1, wherein the step of depositing an overlying protective coating further includes the step of depositing a ceramic layer overlying the protective coating.

7. The method of claim 1, wherein the step of forming precedes and is completed prior to initiation of the step of depositing.

8. The method of claim 1, wherein the step of depositing precedes and is completed prior to initiation of the step of forming.

9. The method of claim 1, including the additional steps, after the step of depositing, of operating the airfoil in a gas turbine engine, removing the airfoil from the gas turbine engine, and repairing the airfoil, the step of repairing including the steps of removing the overlay protective coating from the external airfoil surface of the airfoil, and depositing a second overlay protective coating on the external airfoil surface of the gas turbine airfoil.

10. The method of claim 9, wherein the step of depositing includes the step of ensuring that there is substantially no diffusion aluminide layer between the second overlay protective coating and the external airfoil surface of the airfoil.

11. The method of claim 1, wherein the diffusion aluminide comprises aluminum and a modifying element selected from the group consisting of hafnium, zirconium, yttrium, silicon, titanium, tantalum, cobalt, chromium, platinum, and palladium, and combinations thereof.

12. A method for preparing a coated gas turbine airfoil, comprising the steps of providing a gas turbine airfoil made of a base metal and having an internal cooling passage therein defined by an internal airfoil surface, and an external airfoil surface;

forming a diffusion aluminide protective layer at the internal airfoil surface of the internal cooling passage, the step of forming including the step of taking care that there is substantially no aluminum deposited on the external airfoil surface of the gas turbine airfoil during the step of forming; and depositing an overlay protective coating on the external airfoil surface of the gas turbine airfoil, there being substantially no diffusion aluminide between the overlay protective coating and the external airfoil surface, operating the airfoil in a gas turbine engine;

removing the airfoil from the gas turbine engine; and repairing the airfoil, the step of repairing including the steps of removing the overlay protective coating from the external airfoil surface of the airfoil, and depositing a second overlay protective coating on the external airfoil surface of the gas turbine airfoil, there being substantially no diffusion aluminide layer between the second overlay protective coating and the external airfoil surface of the airfoil.

13. The method of claim 12, wherein there is an initial base metal thickness between the diffusion aluminide protective layer and the external airfoil surface, and after repairing there is a repaired base metal thickness between the diffusion aluminide protective layer and the external airfoil surface that is substantially equal to the initial base metal thickness.

14. The method of claim 12, wherein the overlay protective coating and the second overlay protective coating are each a β-phase NiAl intermetallic.

15. The method of claim 12, wherein the overlay protective coating and the second overlay protective coating each have a thickness of from about 0.0005 to about 0.005 inch thick.

16. The method of claim 1, wherein the overlay protective coating is a β-phase NiAl intermetallic.

17. The method of claim 1, wherein the overlay protective coating has a thickness of from about 0.0005 to about 0.005 inch thick.

18. A coated gas turbine airfoil, comprising:

a gas turbine airfoil formed of a base metal and having internal cooling passage therein and an external airfoil surface;

a diffusion aluminide protective layer at a surface of the internal cooling passage; and an overlay protective coating on the external airfoil surface of the gas turbine airfoil, there being substantially no aluminide layer and no diffusion aluminide between the overlay protective coating and the external airfoil surface of the airfoil.

19. A method for preparing a coated gas turbine airfoil, comprising the steps of providing a gas turbine airfoil formed of a base metal having an internal cooling passage therein defined by an internal airfoil surface, the internal cooling passage extending to an opening in an external surface of the gas turbine airfoil; thereafter depositing a β-phase NiAl intermetallic overlay protective coating on the external airfoil surface of the gas turbine airfoil, there being substantially no aluminum layer between the overlay protective coating and the external airfoil surface; and forming a diffusion aluminide protective layer at the internal airfoil surface of the internal cooling passage.

20. The method of claim 19, wherein the overlay protective coating has a thickness of from about 0.0005 to about 0.005 inch thick.

* * * * *